United States Patent [19]

Fry

[11] Patent Number: 4,862,438
[45] Date of Patent: Aug. 29, 1989

[54] PILLOW/AUDIO SYSTEM COMBINATION

[76] Inventor: Michael L. Fry, 6307-10 Reed Rd., Fort Wayne, Ind. 46815

[21] Appl. No.: 114,690

[22] Filed: Oct. 29, 1987

[51] Int. Cl.[4] .................. G11B 31/00; G11B 33/06
[52] U.S. Cl. .............................. 369/19; 369/63; 369/69; 360/137; 381/188; 381/24; 446/81
[58] Field of Search ............... 360/137, 12; 369/12, 369/19, 20, 63, 69, 292, 75.1; 381/24, 25, 87, 88, 151, 158, 205, 188; 446/73, 81, 219, 302, 297, 299; 5/434, 421, 442; 455/344; 200/52 R; 362/189

[56] References Cited

U.S. PATENT DOCUMENTS

| | | | |
|---|---|---|---|
| D. 234,822 | 4/1975 | Meyer | 381/24 |
| 1,712,158 | 5/1929 | Neal | 5/434 |
| 2,512,641 | 6/1950 | Halstead | 455/344 |
| 2,795,161 | 6/1957 | Weinman | 5/442 |
| 2,958,769 | 11/1960 | Bounds | 455/344 |
| 3,384,719 | 5/1968 | Lanzara | 381/24 |
| 3,621,155 | 11/1971 | Pruitt | 381/24 |
| 3,792,754 | 2/1974 | Hanson | 381/24 |
| 3,946,316 | 3/1976 | Hough | 5/434 |
| 4,038,499 | 7/1977 | Yeaple | 381/24 |
| 4,070,553 | 1/1978 | Hass | 381/24 |
| 4,100,633 | 7/1978 | Pintos | 5/434 |
| 4,242,724 | 12/1980 | Stone | 362/189 |
| 4,361,882 | 11/1982 | Watanabe | 369/30 |
| 4,481,382 | 11/1984 | Villa-Real | 360/137 |
| 4,547,635 | 10/1985 | Segan et al. | 200/52 R |
| 4,589,134 | 5/1986 | Waldron | 381/24 |
| 4,604,987 | 8/1986 | Keltner | 5/421 |
| 4,654,728 | 3/1987 | Lunsford | 360/12 |
| 4,681,195 | 7/1987 | Trahan et al. | 455/344 |
| 4,782,533 | 11/1988 | Haynie | 381/205 |

OTHER PUBLICATIONS

Radio Shack 1986 Catalog, pp. 1, 2, 39, 41, 45, 124 copyright 1985.

Primary Examiner—Alan Faber
Assistant Examiner—Robert A. Weinhardt
Attorney, Agent, or Firm—George Pappas

[57] ABSTRACT

A pillow/audio system combination functioning as both a pillow and an audio system. A substantially rectangularly-shaped pillow casing has stuffing material therein. An audio signal generating device such as a tape recorder is provided within the pillow casing along with a speaker and a battery for providing audible sound. Switches are provided at the corners of the pillow and are connected to the signal generating device for energizing and deenergizing the same. A battery jack is provided on the pillow casing for recharging the batteries therein. An audio jack is also provided on the pillow casing for connecting to a piggyback pillow having therein a speaker, which also generates audible sound via the signal received through the audio jack and an audio extension cord. A pocket is provided within the pillow casing for housing the various components of the audio system.

25 Claims, 2 Drawing Sheets

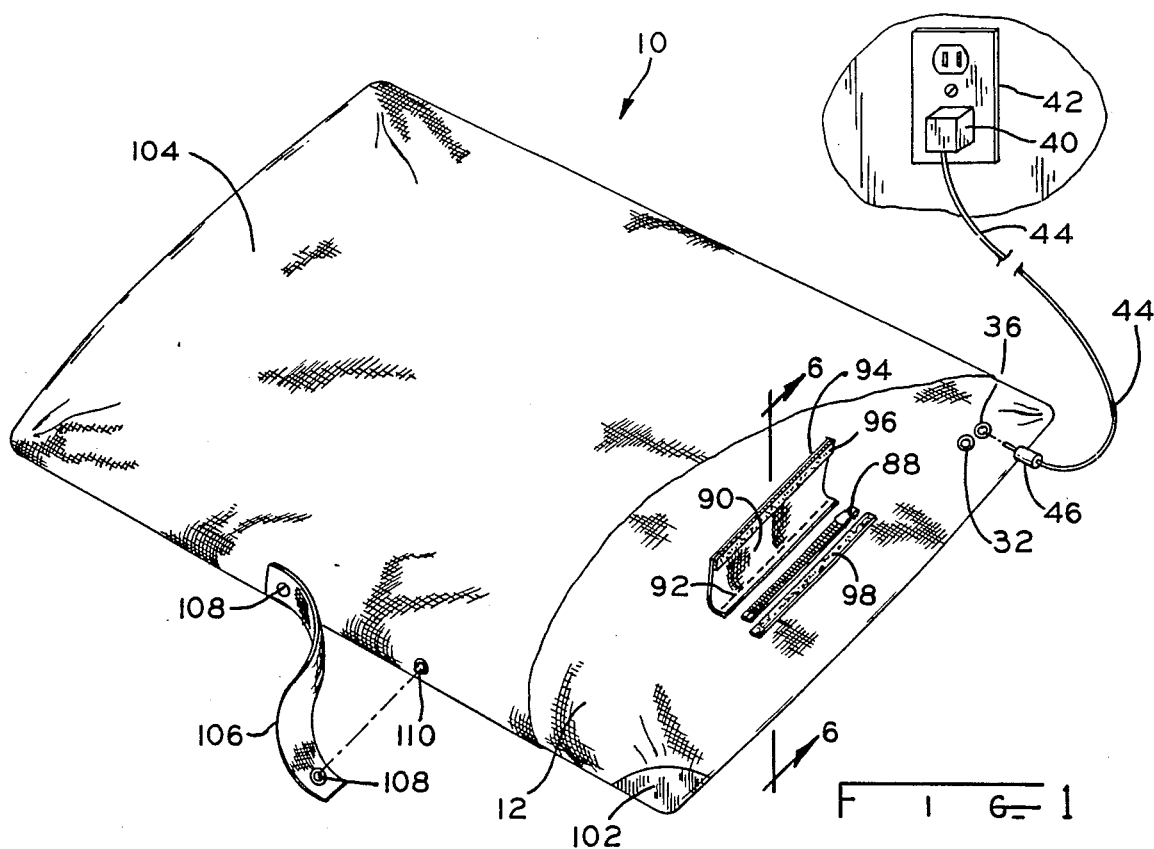
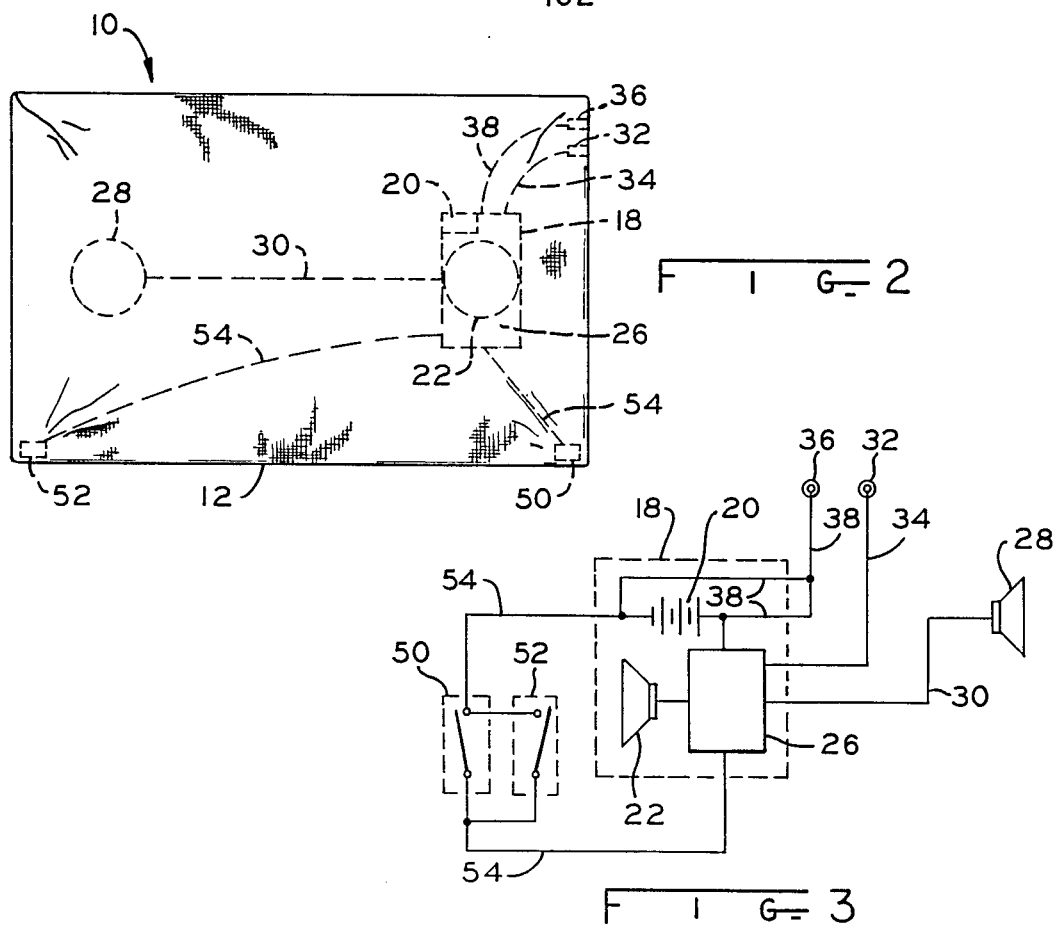

PILLOW/AUDIO SYSTEM COMBINATION

BACKGROUND OF THE INVENTION

This invention relates generally to a pillow/audio system combination which is self-contained and having within the pillow casing, along with the yieldably-resilient stuffing material, an audio signal generating means such as a tape recorder, a speaker electrically connected to the audio signal generating means, and a battery connected to the audio signal generating means in series with a switch means for selectively energizing and deenergizing the audio signal generating means by applying a force to the switch means through the pillow casing.

In the past, radios have been combined within pillows, however, have generally not been self-contained whereby the pillow and radio combination can be transported easily. Furthermore, the pillow/radio combinations generally took no precaution against the tampering of children with the components located within the pillow. The pillow/radio combinations also generally had control knobs sticking out of the pillow and were, thus, substantially uncomfortable in use, especially when one accidentally placed his head on the exteriorly situated control knobs. The radio pillows of the past are also undesirable because the message delivered by the radio is substantially uncontrollable. Thus, it is desirable to provide a self-contained pillow/audio system combination whereby preselected songs and/or messages can be played and heard by the user of the pillow.

Accordingly, a need exists for a pillow/audio system combination generally for use by children and which is substantially tamper proof by younger children. The pillow/audio system combination must be self-contained for easy transporting and yet must be capable of playing music and/or messages which are prerecorded. The pillow/audio system combination must be easily energized and deenergized and yet not have any obtrusive elements of the audio system sticking out of the pillow casing impeding the usual use of the pillow.

SUMMARY OF THE INVENTION

The pillow/audio system combination, according to the present invention, is designed to overcome the above-discussed disadvantages and to fill the needs associated with the above-discussed combinations. This is accomplished, in general, by providing a pillow casing having yieldably-resilient stuffing material disposed therein. An audio signal generating means such as a tape recorder is located within the pillow casing and provides an electrical audio signal to a speaker which is also within the pillow casing. A battery, also within the casing, is connected to the tape recorder in series with a switch means such as two push-on push-off type switches. The switches are located within the casing of the pillow, at the corners thereof, such that a compressive or pushing force thereto causes the switches to activate and, thereby, selectively energize or deenergize the tape recorder. The tape recorder, the speaker, battery, and the switches are all encased within yieldably-resilient stuffing material thereby making the pillow overall comfortable to the user and having no elements sticking out of the pillow casing. Thus, the pillow/audio system combination appears and feels generally identical to that of a regular pillow, however, has a completely self-contained audio system within it which is selectively energized and deenergized by merely compressing a corner thereof.

In one embodiment, the two switches, as described above, are push-on push-off type switches situated in parallel with one another and in series with the battery and the tape recorder and, thus, each of the switches are capable of causing the energizing or deenergizing of the tape recorder. In another embodiment, the switches are two single pole double throw type switches, activated by a compressive/pushing force, connected in series with one another and with the battery and tape recorder and, thus, making the tape recorder capable of being energized or deenergized at any particular time through either of the single pole double throw switches.

The pillow/audio system combination may also include a second speaker connected to the tape recorder and also disposed within the pillow casing and surrounded by yieldably-resilient stuffing material. The second speaker can be used to provide stereo sound and/or merely even out the sound provided by the audio system within the pillow. A timer means may also be connected to the audio system for de-energizing the audio system after a preset period of time. In the alternative, when the audio system utilizes a tape recorder, the recorder can be allowed to play until the end of the tape when the tape recorder automatically shuts off.

An audio jack can be connected to the audio signal generating means or tape recorder within the pillow casing and also physically connected to and leading through the pillow casing so that an audio signal extension cord can be connected thereto and receive the audio signal provide by the audio signal generating means or the tape recorder. A piggyback pillow can also be provided for connecting the other end of the audio signal extension cord and for, thus, providing music and/or a message to the piggyback pillow through the audio signal extension cord. In essence, this is accomplished by locating a speaker within the piggyback pillow casing and a piggyback audio jack connected to the speaker leading through and connected to the piggyback pillow casing. As discussed above, the audio signal extension cord extends between and is connected to the audio jack and the piggyback audio jack.

For further making the pillow/audio system combination self-contained, the batteries used to provide power to the audio signal generating means or tape recorder are rechargeable. A battery jack is connected in series with the rechargeable batteries and leads through and is connected to the pillow casing. The rechargeable batteries are recharged by connecting a recharging unit to the battery jack.

A pocket is provided in the pillow casing having an opening leading to the outside of the casing and a zipper is disposed at the opening of the pocket for selectively sealing and unsealing the pocket. The tape recorder and/or other components are disposed within the pocket for easy access thereto. A flap is connected to the casing substantially near and along the zipper and the flap lies over the zipper and is connected to the casing at its free end on the other side of the zipper through the use of a connecting means such as that sold under the trademark Velcro.

A pillow cover is also provided having an opening for placing the pillow therein. The pillow cover includes a handle detachably attached so that the pillow/audio system combination may be easily transported.

The handle is substantially an elongate strap attached to the pillow cover through the use of snap connectors.

In one form thereof, the present invention relates to a pillow/audio system combination including a pillow casing defining a cavity therein and yieldably-resilient stuffing material disposed in the cavity. An audio signal generating means is disposed in the cavity for generating an electrical audio signal and a speaker, electrically connected to the audio signal generating means, is disposed in the cavity for generating audible sound in response to the electrical audio signal. A battery is disposed in the cavity and is connected to the audio signal generating means for providing electrical power thereto. A switch means is connected in series with the battery and the audio signal generating means for selectively energizing and deenergizing the audio signal generating means by applying a compressive force to the switch means. The switch means is disposed in the cavity and the compressive force is applied thereto through the casing.

In one form thereof, the present invention relates to a pillow/audio system combination including a substantially rectangularly-shaped pillow casing defining a cavity therein and yieldably-resilient stuffing material disposed in the cavity. An audio signal generating means is disposed in the cavity for generating an electrical audio signal. A speaker is electrically connected to the audio signal generating means and is disposed in the cavity for generating audible sound in response to the electrical audio signal. A battery is also disposed in the cavity and is connected to the audio signal generating means for providing electrical power thereto. Two push-on push-off switches are connected in series with the battery and the audio signal generating means and in parallel with one another. The switches are disposed in the corners within the pillow casing whereby the audio signal generating means is selectively energized and deenergized by applying a compressive force to the switches through the casing.

In one form thereof, the present invention relates to a pillow audio system combination including a substantially rectangularly-shaped pillow casing defining a cavity therein and yieldably-resilient stuffing material disposed in the cavity. An audio signal generating means is disposed in the cavity for generating an electrical audio signal. A speaker, electrically connected to the audio signal generating means, is disposed in the cavity for generating audible sound in response to the electrical audio signal. A battery is also disposed in the cavity and is connected to the audio signal generating means for providing electrical power thereto. Two single pole double throw switches are connected in series with one another and with the battery and the audio signal generating means. The switches are disposed in corners within the pillow casing. The switches require a compressive force to switch between respective poles thereof whereby the audio signal generating means is selectively energized and deenergized at any particular time through either of the single pole double throw switches by applying a compressive force to the switches through the casing.

BRIEF DESCRIPTION OF THE DRAWINGS

The above mentioned and other features and objects of this invention and the manner of attaining them will become more apparent and the invention itself will be better understood by reference to the following description of embodiments of the invention taken in conjunction with the accompanying drawings wherein:

FIG. 1 is a perspective view of the pillow/audio system combination showing the pillow cover, pocket, and recharging unit;

FIG. 2 is a top plan view of the pillow audio system combination showing, in dashed lines, the speakers, jacks, switches, and the audio signal generating means within the pillow casing of FIG. 1;

FIG. 3 is a schematic diagram of an audio system located in the pillow casing of FIG. 1 according to a first embodiment;

Corresponding reference characters indicate corresponding parts throughout the several views of the drawings.

Figure 4:
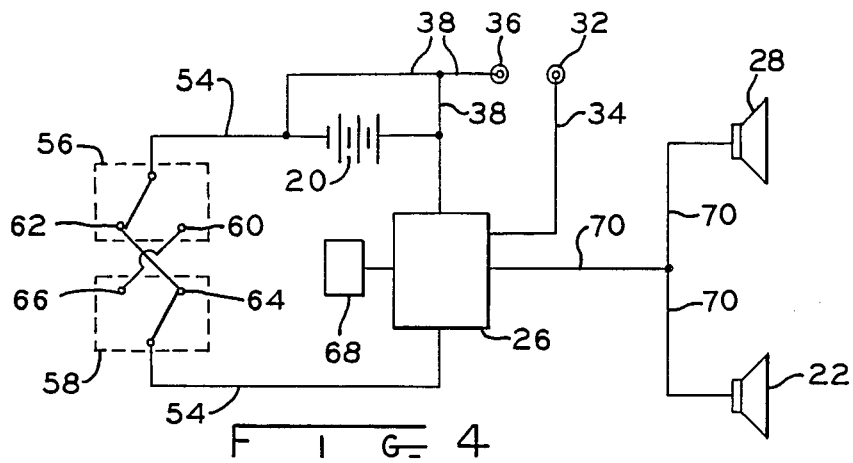
FIG. 4 is a schematic diagram of an audio system located in the pillow casing of FIG. 1 according to a second embodiment.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

As shown in the drawings, a specific embodiment of the present invention is a pillow/audio system combination generally designated as 10. Combination 10, as shown in FIG. 1, includes a pillow casing 12 having a substantially rectangular shape and made of cloth or other suitable materials. Pillow casing 12, when made of cloth, is sewn together in a known and customary manner and includes within it yieldably-resilient stuffing material 14, more clearly shown in FIG. 6. Stuffing material 14, in essence, is disposed within the cavity 16 defined by pillow casing 12.

Within pillow casing cavity 16, there is disposed a self-contained cassette tape recording unit 18 which includes a battery electrical power source 20, speaker 22 and an audio signal generating means, such as a tape recorder, for generating an electrical audio signal in response to a particular tape recording located within the tape recorder. It should be understood that unit 18 need not be self-contained and that battery 20, speaker 22, and the audio signal generating means 26 can be separate units as more specifically shown in the embodiment of FIG. 4. Furthermore, the audio signal generating means 26 can include a radio receiver or a tape recorder, or the combination of a tape recorder and radio receiver. It is, however, convenient to provide a self-contained unit as shown in FIGS. 2 and 3 for ease of manufacturing. In either case, however, speaker 22 is connected to the audio signal generating means 26 and is disposed within cavity 16 for generating audible sound in response to an electrical audio signal produced by the audio signal generating means 26. Furthermore, battery 20 is also disposed within cavity 16 and is connected in series to the audio signal generating means 26 for providing electrical power thereto.

A second speaker 28 is provided within cavity 16 and is connected to the audio signal generating means 26 for generating audible sound in response to the electrical audio signal provided by the audio signal generating means 26. Speaker 28, along with speaker 22, can be used and connected in a known and customary manner to produce stereo sound therebetween. Wires 30 are provided for connecting speaker 28 and audio signal generating means 26.

An audio jack 32 is connected to the audio signal generating means 26 via wires 34 and receives the electrical audio signal provided by the audio signal generating means 26. Audio jack 32 is physically connected to casing 12 as shown in FIGS. 1 and 2 and leads through to the outside of casing 12 for connection thereto by a audio plug.

A battery jack 36 is connected via wires 38 across battery 20 and, thus, by providing a rechargeable battery in place of battery 20, the same can be recharged through the use of battery jack 36. In this regard, a recharging unit 40 drawing electrical power from a common household outlet 42 may be connected via wires 44 and battery recharge plug 46 to battery jack 36 for recharging the rechargeable batteries. After the batteries have been sufficiently charged, battery recharge plug 46 may be retracted from battery jack 36 and the pillow audio system combination may again be used until the batteries run low. It should be noted that, in the alternative, if common batteries are used, that the same can be replaced by physically removing unit 18 from pocket 48 as described hereinbelow with respect to FIG. 6.

A switch means is provided and connected in series with battery 20 and the audio signal generating means 26 as shown in FIGS. 2-4, for selectively energizing and deenergizing the audio signal generating means 26. More specifically, the switch means shown in FIG. 3 includes two single pole single throw switches 50 and 52 connected in parallel with one another. Switches 50 and 52 are of the push-on push-off type requiring a compressive or pushing force there against for placing the same in a state of "on" or in a state of "off". Switches 50 and 52 are located in the corners of and within the pillow casing 12 as shown in FIG. 2 Switches 50 and 52 are connected to unit 18 via switches wires 54. Thus, by providing a compressive or pushing force at the proper corners of pillow casing 12, audio signal generating means 26 can be energized or deenergized. This is accomplished by placing either of switches 50 or 52 in a closed position. It should further be noted that in the embodiment of FIG. 3, if the audio signal generating means 26 is energized by pushing on switch 50, because switch 50 is in parallel with switch 52, the audio signal generating means 26 must be deenergized by pushing switch 50 again and placing the same in the "off" state position. Furthermore, as switch 52 is in parallel with switch 50, the same applies with respect thereto. The switch means described in FIG. 4 hereinbelow, however, operates differently to allow the energizing and deenergizing of audio signal generating means 26 at any particular time through either of the single pole double throw switches utilized therein.

More specifically, in the second embodiment of the present invention as shown in FIG. 4, the switch means includes single pole double throw switches 56 and 58 connected in series with each other and with battery 20 and signal generating means 26 via wires 54. Switch 56 has poles 60 and 62 and switch 58 has poles 64 and 66.

Pole 60 is connected to pole 66 and pole 64 is connected to pole 62. Furthermore, switches 56 and 58 are of the type that require a compressive or a pushing force to switch between the respective poles thereof. Switches 56 and 58 of this embodiment are also located in the corners of casing 12 as described hereinabove with respect to switches 50 and 52. Thus, a compressive or pushing force through the casing is required to place either of switches 56 or 58 in contact with an opposite pole. Thus, in the operation of the second embodiment, the audio signal generating means can be energized or deenergized at any particular time through the use of either of the switches 56 or 58.

The embodiment of FIG. 4 also includes a battery jack 36 connected across battery 20 for recharging battery 20 as described hereinabove with respect to the embodiment shown in FIG. 3. Furthermore, an audio jack 32 is connected to the audio signal generating means and is adapted to receive an audio plug as described hereinabove with respect to the embodiment of FIG. 3.

A timer means, which is either a mechanical or electrical type timer, is connected to the audio signal generating means for deenergizing the audio signal generating means after a preset period of time after the audio signal generating means has been energized via the above-described switch means. Thus, in the event that an individual using the pillow audio system combination falls asleep, the audio signal generating means is deenergized via the timer means after a preset period of time. It should be noted that when a tape recorder is used as the audio signal generating means, and the same is of a cassette-type recorder, the audio signal generating means is automatically deenergized at the end of the cassette as is commonly done with cassette tape recorders. Thus, a timer means 68 need not necessarily be used as the same is substantially replaced by the cassette recorder mechanism adapted to deenergize the audio signal generating means at the end of the cassette tape.

Speakers 22 and 28, as shown in FIG. 4, are physically detached from signal generating means 26 and are electrically connected thereto via wires 70. Speakers 22 and 28, as described hereinabove with respect to FIG. 3, may be connected to provide stereo sound.

Figure 5:
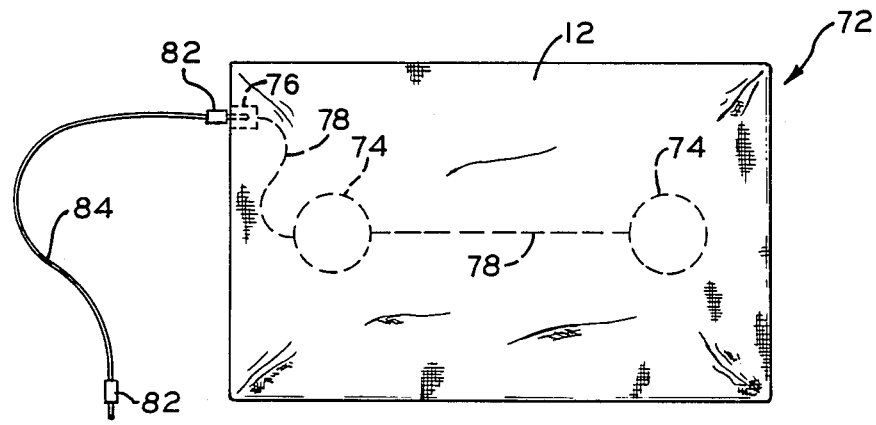
FIG. 5 is a top plan view of a piggyback pillow showing, in dashed lines, speakers located therein and also showing an audio signal extension for connecting to the pillow/audio system combination of FIG. 1; and, FIG. 6 is a partial cut-away view along line 6—6 of FIG. 1 and showing the pocket within the pillow casing housing a tape recorder.

A piggyback pillow generally designated as 72 is shown in FIG. 5 and has a casing 12 having a substantially rectangular shape as described hereinabove with respect to pillow/audio system combination 10. Pillow 72 also has a cavity wherein there is disposed yieldably-resilient stuffing material as described hereinabove with respect to combination 10. Two piggyback speakers 74 are disposed within the cavity of pillow 72 and are connected to piggyback/audio jack 76 via wires 78. Audio jack 76 leads through and is connected to the piggyback/pillow casing 12 as described hereinabove with respect to audio jack 32. Audio jack 76, like audio jack 32, is adapted to receive an audio plug.

An audio signal extension means is provided for connecting between jacks 32 and 76 for providing the audio signal generated by the signal generating means 26 to the piggyback speakers 74 of piggyback pillow 72. Speakers 74 generate audible sound in response to the received audio signal. The extension means includes audio plugs 82 interconnected with extension wires 84. Plugs 82, as described hereinabove, are adapted to be received by audio jacks 32 and 76.

Figure 6:
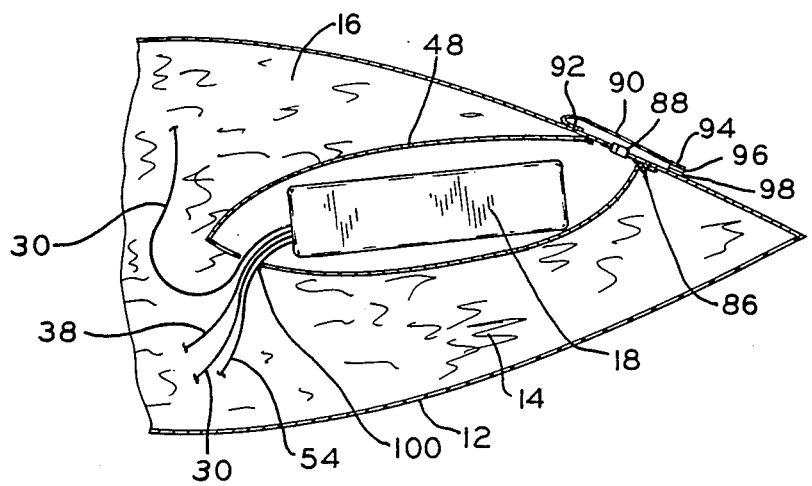

The components of the audio system, as described hereinabove, can be neatly situated within a pocket 48 for easily accessing the same and for retaining them in a particular location within pillow casing 12. Pocket 48 has an elongate opening 86 leading to the outside thereof through casing 12. A zipper 88 is sewn along elongate pocket opening 86 for selectively sealing and unsealing the pocket by closing or opening the zipper 88. A flap 90, made of cloth or other suitable material, is connected at one end 92 thereof along opening 86 and is adapted to lie over zipper 88 when closed as shown in FIG. 6. Flap 90, at its free end 94 thereof, has attached thereto an elongate strip of pile material 96 and is attachable and detachable from an elongate strip of hook material 98 attached to casing 12 along opening 86 opposite the side of which flap 90 is attached to casing 12. The complimentary fastening materials 96 and 98 can be of the pile and hook material sold under the trademark Velcro. In this fashion, flap 92 can be folded over and retained over zipper 88 thereby substantially hiding the same from plain view and generally preventing small children from obtaining access to the interior of pocket 48.

Cassette tape recording unit 18 is located within pocket 48 and wires leading thereto extend out of pocket 48 via hole 100 to the various components located within pillow casing 12. It should be noted, however, that where a single compact unit 18 is not used, the separate components of the audio system can also be situated within pocket 48 making the same also easily accessible. Thus, in operation, one may reach into pocket 48 to replace the batteries 20, to change, turn over, or rewind a tape if a tape recorder is situated therein, or merely to gain access for repairing the audio system.

As shown in FIG. 1, casing 12 may include corners having a glow-in-the-dark type paint or patch 102 so that the same can be easily seen in the absence of light. The switch means are placed in the same corners as those of patches 102 and, thus, one can easily see where a compressive or pushing force is required to energize or deenergize the audio system.

A pillow cover 104, also being substantially rectangularly shaped and having an opening at one end thereof, is provided for receiving therein the pillow audio system combination. A handle 106 is detachably attached to pillow cover 104 so that the pillow cover and pillow audio system combination can be easily transported by merely lifting the same via handle 106. In essence, handle 106 is an elongate strap having two ends thereof whereat snap connectors are used to attach the same to cover 104. The snap connectors include a male part 108 connected to handle 106 and a female part 110 connected to pillow cover 104. Thus, the handle strap is attachable to the pillow cover 104 by applying a sufficient compressive force to the female and male parts 108 and 110 so as to snap the parts together. The handle and pillow cover are detachable from one another by applying sufficient pulling force between the handle 106 and cover 104 so as to unsnap the male and female parts 108 and 110 of the snap connectors apart from one another.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A pillow audio system combination comprising:
    a pillow casing defining a cavity therein,
    yieldably-resilient stuffing material disposed in said cavity;
    an audio signal generating means disposed in said cavity for generating an electrical audio signal;
    a speaker electrically connected to said audio signal generating means disposed in said cavity for generating audible sound in response to said electrical audio signal;
    a battery disposed in said cavity and connected to said audio signal generating means for providing electrical power thereto;
    switch means connected in series with said battery and said audio signal generating means for selectively energizing and deenergizing said audio signal generating means by applying a compressive force to said switch means, said switch means disposed in said cavity and said compressive force being applied through said casing; and,
    an audio jack connected to said audio signal generating means for receiving said electrical audio signal from said audio signal generating means, said audio jack extending through and connected to said casing;

2. The combination of claim 1 wherein said casing is substantially rectangular-shaped and said switch means is disposed in a corner thereof.

3. The combination of claim 2 wherein said corner of said pillow casing whereat there is disposed said switch means further includes a glow-in-the-dark patch portion whereby said corner whereat said compressive force is required for energizing and deenergizing said audio signal generating means can be seen in the absence of light.

4. The combination of claim 1 wherein said switch means includes two push-on push-off switches in parallel with one another and in series with said battery and said signal generating means, each of said switches thereby capable of causing the energizing or deenergizing of said signal generating means.

5. The combination of claim 1 wherein said switch means includes two single pole double throw switches connected in series with one another whereby said signal generating means is capable of being energized or deenergized at any particular time through either of said single pole double throw switches.

6. The combination of claim 1 further comprising a second speaker electrically connected to said audio signal generating means and disposed in said cavity for generating audible sound in response to said electrical audio signal.

7. The combination of claim 1 further comprising timer means connected to said audio signal generating means for deenergizing said audio signal generating means after a preset period of time after said audio signal generating means has been energized via said switch means.

8. The combination of claim 1 further including a piggyback pillow comprising:
    a piggyback pillow casing defining a cavity therein;
    yieldably-resilient stuffing material disposed in said cavity of said piggyback pillow casing;
    a piggyback speaker disposed in said cavity of said piggyback pillow casing;

a piggyback audio jack connected to said piggyback speaker and leading through and connected to said piggyback pillow casing; and, an audio signal extension for connecting to and between said audio jack and said piggyback audio jack whereby said audio signal is received by said piggyback speaker for generating audible sound in response thereto within said piggyback casing.

9. The combination of claim 1 wherein said electrical battery is rechargeable and further comprising a battery jack connected in series with said rechargeable battery and leading through and connected to said casing whereby said rechargeable battery is recharged by connecting a recharging unit to said battery jack.

10. The combination of claim 1 further comprising a pocket in said casing having an opening in said casing leading to the outside thereof;

a zipper disposed at the opening of said pocket for selectively sealing and unsealing said pocket; and, wherein said audio signal generating means is disposed in said pocket.

11. The combination of claim 10 further comprising a flap member connected to said casing substantially near and along said zipper, said flap lying over said zipper and connected to said casing at its other end thereof.

12. The combination of claim 1 further comprising a pillow cover having an opening, said pillow audio system combination received within said pillow cover through said opening, said pillow cover further including a handle attached thereto whereby said pillow cover and pillow audio system combination may be easily transported.

13. The combination of claim 12 wherein said handle includes an elongate strap and wherein said handle attachment includes a snap connector at each end of said strap having releasable male and female parts, one of said parts attached to said strap and the other of said parts attached to said pillow cover whereby said strap handle is attachable to said pillow cover by applying sufficient compression force to said male and female parts of said connectors to snap said parts together and wherein said strap and pillow cover are detachable from one another by applying sufficient pulling force to said strap handle to unsnap said male and female parts of said connectors from one another.

14. The combination of claim 1 wherein said audio signal generating means includes an audio tape player.

15. The combination of claim 1 wherein said audio signal generating means includes a radio receiver.

16. A pillow/audio system combination comprising:
a pillow casing defining a cavity therein;
yieldably-resilient stuffing material disposed in said cavity;
an audio signal generating means disposed in said cavity for generating an electrical audio signal selected from a group consisting of an audio tape player or a radio receiver;
a speaker electrically connected to said audio signal generating means disposed in said cavity for generating audible sound in response to said electrical audio signal;
a battery disposed in said cavity and connected to said audio signal generating means for providing electrical power thereto; and,
two push-on push-off switches connected in series with said battery and said audio signal generating means and in parallel with one another, said switches disposed within said pillow casing whereby said audio signal generating means is selectively energized and deenergized by applying a compressive force to said switches through said casing.

17. The combination of claim 16 further comprising an audio jack connected to said audio signal generating means for receiving said electrical audio signal, said audio jack leading through and connected to said casing and further including a piggyback pillow comprising:
a piggyback pillow casing defining a cavity therein;
yieldably-resilient stuffing material disposed in said cavity of said piggyback pillow casing;
a piggyback speaker disposed in said cavity of said piggyback pillow casing;
a piggyback audio jack connected to said piggyback speaker and leading through and connected to said piggyback pillow casing; and
an audio signal extension for connecting to and between said audio jack and said piggyback audio jack whereby said audio signal is received by said piggyback speaker for generating audible sound in response thereto within said piggyback casing.

18. The combination of claim 16 wherein said electrical battery is rechargeable and further comprising a battery jack connected in series with said rechargeable battery and leading through and connected to said casing whereby said rechargeable battery is recharged by connecting a recharging unit to said battery jack.

19. The combination of claim 16 further comprising a pillow cover having an opening, said pillow/audio system combination received within said pillow cover through said opening, said pillow cover further including a handle attached thereto whereby said pillow cover and pillow/audio system combination may be easily transported, wherein said handle includes an elongate strap and wherein said handle attachment includes a snap connector at each end of said strap having releasable male and female parts, one of said parts attached to said strap and the other of said parts attached to said pillow cover whereby said strap handle is attachable to said pillow cover by applying sufficient compression force to said male and female parts of said connectors to snap said parts together and wherein said strap and pillow cover are detachable from one another by applying sufficient pulling force to said strap handle to unsnap said male and female parts of said connectors from one another.

20. The combination of claim 16 wherein said pillow casing is substantially rectangularly-shaped having four corners, at least one of said switches disposed substantially near at least one of said pillow corners.

21. A pillow/audio system combination comprising:
a pillow casing defining a cavity therein;
yieldably-resilient stuffing material disposed in said cavity;
an audio signal generating means disposed in said cavity for generating an electrical audio signal;
a speaker electrically connected to said audio signal generating means disposed in said cavity for generating audible sound in response to said electrical audio signal;
a battery disposed in said cavity and connected to said audio signal generating means for providing electrical power thereto; and,
two single pole double throw switches connected in series with one another and with said battery and said audio signal generating means, said switches disposed in said pillow casing, said switches requiring a compressive force to switch between respective poles thereof, whereby said audio signal generating means is selectively energized and deenergized at any particular time through either of said single pole double throw switches by applying a compressive force to said switches through said casing.

22. The combination of claim 21 further comprising an audio jack connected to said audio signal generating means for receiving said electrical audio signal, said audio jack leading through and connected to said casing and further including a piggyback pillow comprising:
   a piggyback pillow casing defining a cavity therein;
   yieldably-resilient stuffing material disposed in said cavity of said piggyback pillow casing;
   a piggyback speaker disposed in said cavity of said piggyback pillow casing;
   a piggyback audio jack connected to said piggyback speaker and leading through and connected to said piggyback pillow casing; and,
   an audio signal extension for connecting to and between said audio jack and said piggyback audio jack whereby said audio signal is received by said piggyback speaker for generating audible sound in response thereto within said piggyback casing.

23. The combination of claim 21 wherein said electrical battery is rechargeable and further comprising a battery jack connected in series with said rechargeable battery and leading through and connected to said casing whereby said rechargeable battery is recharged by connecting a recharging unit to said battery jack.

24. The combination of claim 21 further comprising a pillow cover having an opening, said pillow/audio system combination received within said pillow cover through said opening, said pillow cover further including a handle attached thereto whereby said pillow cover and pillow/audio system combination may be easily transported, wherein said handle includes an elongate strap and wherein said handle attachment includes a snap connector at each end of said strap having releasable male and female parts, one of said parts attached to said strap and the other of said parts attached to said pillow cover whereby said strap handle is attachable to said pillow cover by applying sufficient compression force to said male and female parts of said connectors to snap said parts together and wherein said strap and pillow cover are detachable from one another by applying sufficient pulling force to said strap handle to unsnap said male and female parts of said connectors from one another.

25. The combination of claim 21 wherein said pillow casing is substantially rectangularly-shaped having four corners, at least one of said switches disposed substantially near at least one of said pillow corners.

* * * * *